US009045152B2

(12) United States Patent
Sekine et al.

(10) Patent No.: US 9,045,152 B2
(45) Date of Patent: Jun. 2, 2015

(54) ELECTRIC ASSIST CART

(71) Applicant: KAYABA INDUSTRY CO., LTD., Minato-ku, Tokyo (JP)

(72) Inventors: Shinichi Sekine, Fukaya (JP); Osamu Miyatani, Kani (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/351,358

(22) PCT Filed: Oct. 3, 2012

(86) PCT No.: PCT/JP2012/075683
§ 371 (c)(1),
(2) Date: Apr. 11, 2014

(87) PCT Pub. No.: WO2013/054713
PCT Pub. Date: Apr. 18, 2013

(65) Prior Publication Data
US 2014/0244093 A1    Aug. 28, 2014

(30) Foreign Application Priority Data
Oct. 13, 2011    (JP) .................................. 2011-225971

(51) Int. Cl.
*B60L 15/20*    (2006.01)
*B62B 5/00*    (2006.01)
(Continued)

(52) U.S. Cl.
CPC .............. *B62B 5/0033* (2013.01); *B60L 1/003* (2013.01); *B60L 3/0061* (2013.01); *B60L 3/0084* (2013.01);
(Continued)

(58) Field of Classification Search
CPC ..... B60L 3/0061; B60L 3/04; B60L 11/1805; B60L 2240/423; Y02T 10/642
See application file for complete search history.

(56) References Cited

U.S. PATENT DOCUMENTS 4,697,661 A * 10/1987 Pajerski et al. ................ 180/6.5
5,746,282 A *  5/1998 Fujiwara et al. ............... 180/6.2
(Continued)

FOREIGN PATENT DOCUMENTS

| JP | 09-056015 A | 2/1997 |
| JP | 9-109894 A  | 4/1997 |

(Continued)

OTHER PUBLICATIONS

International Search Report mailed Dec. 18, 2012, in corresponding International Application No. PCT/JP2012/075683.
(Continued)

*Primary Examiner* — Michael J Zanelli
(74) *Attorney, Agent, or Firm* — Lowe Hauptman & Ham, LLP

(57) ABSTRACT

An electric assist cart includes: a body frame; a drive wheel; a control handle by which a user can input a driving force to the body frame; a torque sensor that detects a driving torque input to the body frame from the control handle; a controller that computes an assisting force based on the driving torque; and an electric motor that applies the assisting force to the drive wheel. The controller includes an electric current determination part that determines whether or not an electric current having a magnitude equal to or larger than a first setting value continuously flows for a first setting time, and an electric current control part that reduces a maximum value of the electric current that can be supplied to the electric motor to be smaller than the first setting value based on the determination of the electric current determination part.

6 Claims, 5 Drawing Sheets

(51) Int. Cl.
*B60L 1/00* (2006.01)
*B60L 3/00* (2006.01)
*B60L 3/04* (2006.01)
*B60L 7/12* (2006.01)
*B60L 11/18* (2006.01)
*B62B 3/00* (2006.01)

(52) U.S. Cl.
CPC ... *B60L 3/04* (2013.01); *B60L 7/12* (2013.01); *B60L 11/1805* (2013.01); *B60L 15/2009* (2013.01); *B60L 15/2036* (2013.01); *B60L 2200/30* (2013.01); *B60L 2220/46* (2013.01); *B60L 2240/36* (2013.01); *B60L 2240/423* (2013.01); *B60L 2250/16* (2013.01); *B60L 2270/145* (2013.01); *Y02T 10/7005* (2013.01); *Y02T 10/642* (2013.01); *B62B 5/0073* (2013.01); *B62B 3/001* (2013.01); *B62B 2203/10* (2013.01); *B62B 2301/20* (2013.01); *B60L 3/0076* (2013.01); *B60L 11/1877* (2013.01); *Y02T 10/705* (2013.01); *Y02T 10/7275* (2013.01)

(56) References Cited

U.S. PATENT DOCUMENTS

| | | | | |
|---|---|---|---|---|
| 6,276,471 | B1 * | 8/2001 | Kratzenberg et al. | 180/19.3 |
| 7,220,222 | B2 * | 5/2007 | Springston et al. | 483/28 |
| 7,779,941 | B1 * | 8/2010 | Rankin et al. | 180/19.1 |
| 2011/0015842 | A1 * | 1/2011 | Kume et al. | 701/67 |

FOREIGN PATENT DOCUMENTS

| | | | |
|---|---|---|---|
| JP | 9-150740 | * | 6/1997 |
| JP | 09-202235 A | | 8/1997 |
| JP | 9-284991 A | | 10/1997 |
| JP | 10-336803 A | | 12/1998 |
| JP | 11-005537 A | | 1/1999 |
| JP | 11-276527 A | | 10/1999 |
| JP | 2000-214015 A | | 8/2000 |
| JP | 2005-280385 A | | 10/2005 |
| JP | 2006-001426 A | | 1/2006 |
| JP | 2006-137391 A | | 6/2006 |
| JP | 2006-290319 A | | 10/2006 |
| JP | 2008-54440 A | | 3/2008 |
| JP | 2009-131069 A | | 6/2009 |
| JP | 2010-123044 A | | 6/2010 |
| JP | 2011-115025 A | | 6/2011 |
| JP | 2012-166748 A | | 9/2012 |

OTHER PUBLICATIONS

Office Action mailed Feb. 3, 2015, corresponding to Japanese patent application No. 2011-225971.

* cited by examiner

ELECTRIC ASSIST CART

RELATED APPLICATIONS

The present application is a National Phase of International Application Number PCT/JP2012/075683, filed Oct. 3, 2012, which claims priority to Japanese Application Number 2011-225971, filed Oct. 13, 2011.

TECHNICAL FIELD

This invention relates to an electric assist cart in which a driving force is assisted by an electric motor.

BACKGROUND ART

In general, when a heavy burden is loaded on a handcart used in a factory or the like, an operator necessarily pushes the handcart with a strong force at the start of delivery. This is a hard work.

As a countermeasure for this problem, JP 2006-290319 A proposes an electric assist hand-push cart in which an operator's force applied to the handcart is detected, and an assistant power corresponding to the human power is applied from an electric motor. In this electric assist hand-push cart, a force applied by an operator in forward and backward movements is assisted depending on the handling of a hand-push frame body from an operator.

SUMMARY OF INVENTION

However, in the electric assist hand-push cart disclosed in JP 2006-290319 A, if an operator continuously handles a hand-push frame body, an electric motor continuously generates an assistant power. For this reason, for example, in a drive condition in which a strong assistant power is continuously generated, the electric motor or the controller may suffer from an overload condition. Therefore, reliability of the electric assist cart may be degraded.

It is therefore an object of this invention to improve reliability of the electric assist cart.

According to one aspect of this invention, an electric assist cart that can travel by applying an assisting force in addition to a driving force applied by an operator includes: a body frame where a burden can be loaded; a drive wheel provided in the body frame; a handling portion pushed and handled by an operator to input a driving force to the body frame; a torque detection part that is configured to detect a driving force applied to the body frame by pushing and handling the handling portion; a controller that is configured to compute an assisting force applied to the drive wheel based on the driving torque detected by the torque detection part; and an electric motor that is configured to apply the assisting force computed by the controller to the drive wheel. The controller includes an electric current determination part that is configured to determine whether or not an electric current having a magnitude equal to or larger than a first setting value continuously flows for a first setting time, and an electric current control part that is configured to reduce a maximum value of the electric current that can be supplied to the electric motor to be smaller than the first setting value based on the determination of the electric current determination part.

The details as well as other features and advantages of this invention are set forth in the remainder of the specification and are shown in the accompanying drawings.

DESCRIPTION OF EMBODIMENTS

Figure 1:
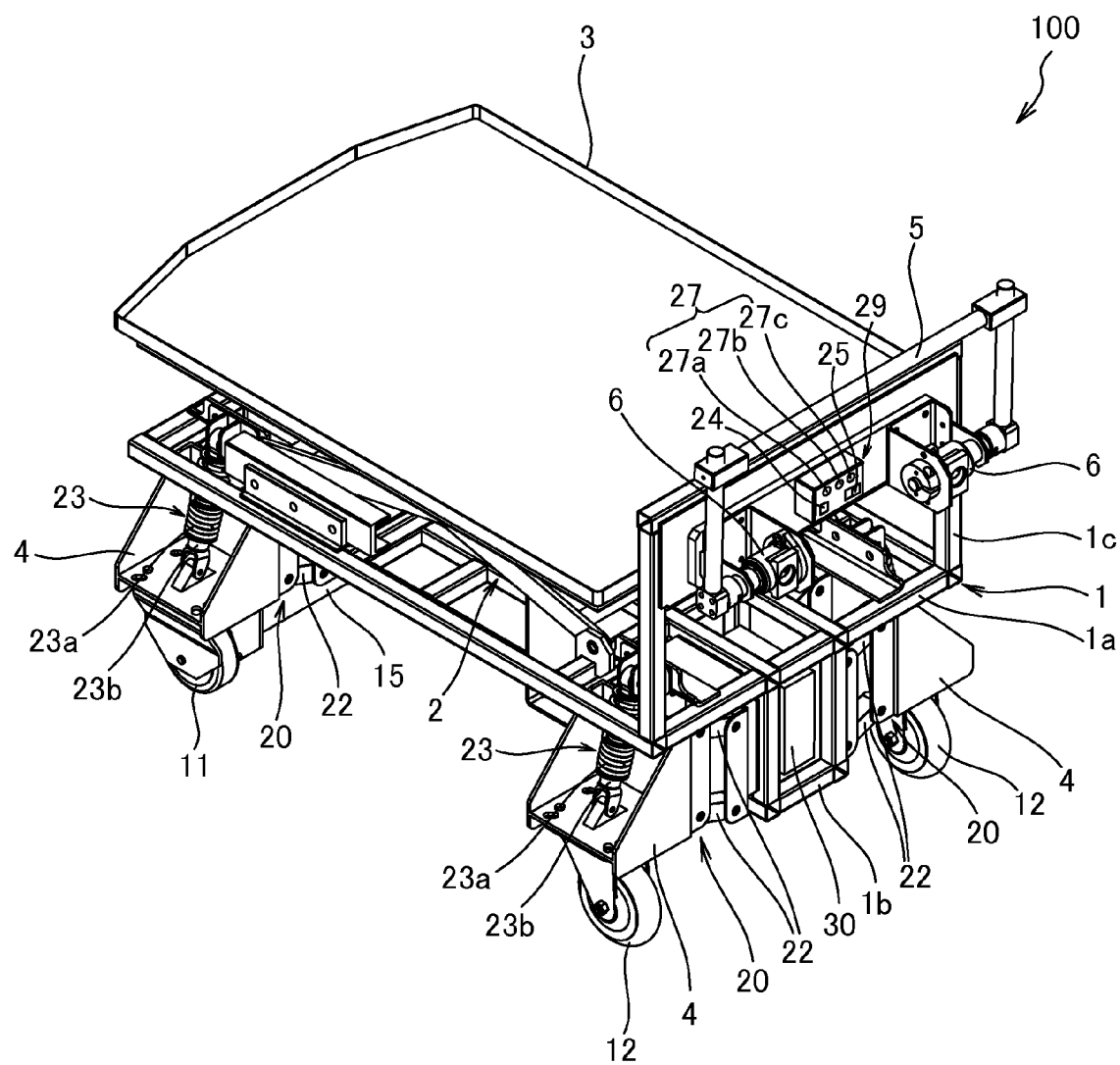
FIG. 1 is a perspective view illustrating an electric assist cart according to an embodiment of the present invention.

Hereinafter, embodiments of the present invention will be described with reference to the accompanying drawings.

First, an electric assist cart 100 according to an embodiment of the invention will be described with reference to FIGS. 1 to 4.

The electric assist cart 100 is used to carry a heavy burden, for example, in a factory or the like. The electric assist cart 100 travels by virtue of an assisting force caused by rotation of an electric motor 15 described below in addition to a driving force applied from an operator.

The electric assist cart 100 includes a body frame 1, a deck 3 provided on the body frame 1 to load a burden, a control handle 5 as a handling portion by which a driving force can be input from both left and right portions of the body frame 1, a pair of drive wheels 11 provided in both left and right sides of the body frame 1 with an interval in a travel direction, and a pair of universal wheels 12 installed in the body frame 1 in rear of the drive wheels 11. The drive wheels 11 are front wheels of the electric assist cart 100, and the universal wheels 12 are rear wheels of the electric assist cart 100.

The body frame 1 is a frame obtained by combining rectangular pipes. The body frame 1 includes a planar portion 1a where a burden is loaded using a deck 3, a lower projecting portion 1b projecting in the lower side of the planar portion 1a, and an erected portion 1c erected on the upper portion of the rear end of the planar portion 1a.

The deck 3 is a rimmed flat plate provided to cover the top of the planar portion 1a of the body frame 1. A burden is directly loaded on the deck 3. The deck 3 may be an unrimmed flat plate. In addition, instead of the deck 3, a roller conveyor may be installed on the body frame 1, and a burden may be loaded using the roller conveyor.

Figure 2:
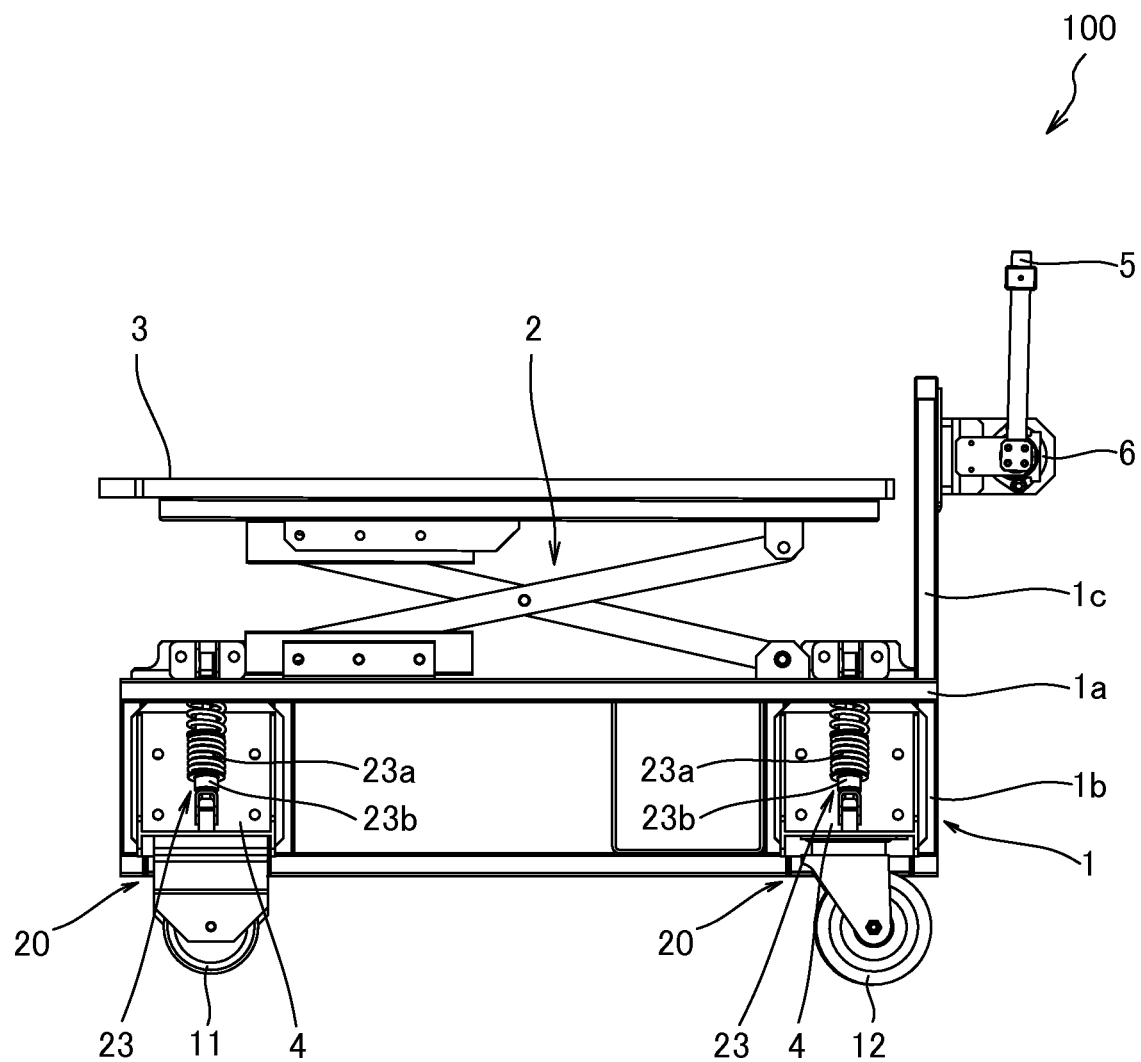
FIG. 2 is a side view of FIG. 1.

As illustrated in FIG. 2, a lift unit 2 is provided between the body frame 1 and the deck 3. The lift unit 2 lifts or lowers the deck 3 against the body frame 1 using an electric lift cylinder 2a (refer to FIG. 4). For example, when a heavy burden is loaded on the deck 3, and the body frame 1 sinks to the drive wheel 11 and the universal wheel 12 by means of a suspension unit 20 described below, the lift unit 2 may lift the deck 3 to constantly maintain a height of the deck 3 from the road surface.

The electric lift cylinder 2a is electrically connected to a controller 30 described below and expands or contracts in response to an instruction signal from the controller 30. The electric lift cylinder 2a is an electric hydraulic linear actuator provided with a hydraulic pump driven by a motor so as to expand or contract by a pressure of the hydraulic fluid discharged from the hydraulic pump.

The control handle 5 is a reversed U-shaped handle pushed and handled by an operator as illustrated in FIG. 1. Both left and right ends of the control handle 5 are connected to the erected portion 1c of the body frame 1. As a result, a driving force input when an operator handles the control handle 5 is transmitted to the body frame 1.

The drive wheel 11 is a small wheel unturnably provided in a longitudinal direction of the body frame 1. A pair of left and right drive wheels 11 is provided in the vicinity of the front end of the body frame 1. The drive wheels 11 are fixed to the lower projecting portion 1*b* of the body frame 1 movably upward and downward.

The universal wheel 12 is a small wheel directed to a movement direction at all times when the cart travels. The universal wheel 12 turns by a frictional resistance with the road surface to steer the cart toward a movement direction. The universal wheel 12 is fixed to the lower projecting portion 1*b* of the body frame 1 movably upward and downward.

The electric assist cart 100 includes four subsidiary frames 4 movable upward and downward against the body frame 1 and a suspension unit 20 that suspends the driving wheels 11 and the universal wheels 12 from the subsidiary frame 4.

Four subsidiary frames 4 are provided for a pair of drive wheels 11 and a pair of universal wheels 12. Two subsidiary frames 4 are arranged in each of the left and right sides of the body frame 1. The drive wheel 11 or the universal wheel 12 is rotatably fixed to the lower surface of each subsidiary frame 4.

The suspension unit 20 includes four suspension arms 22 for supporting the left and right subsidiary frames 4 of the body frame 1 movably upward and downward and spring dampers 23 provided between the body frame 1 and the left and right subsidiary frames 4.

Four suspension arms 22 are provided for a single subsidiary frame 4. Both ends of each suspension arm 22 are connected to the body frame 1 and the left and right subsidiary frames 4 pivotably around a horizontal axis, so that the suspension arm 22 serves as a parallel link mechanism that supports the subsidiary frame 4 against the body frame 1 to allow for parallel displacement.

As a result, even when the subsidiary frame 4 is lifted or lowered against the body frame 1, a posture of the subsidiary frame 4 does not change, and a positional relationship (alignment) between the drive wheel 11 and the universal wheel 12 is maintained constantly. Therefore, even when the subsidiary frame 4 is lifted or lowered, it is possible to suppress one of the drive wheel 11 and the universal wheel 12 from floating from the road surface.

The spring damper 23 absorbs or dampens vertical vibration in the drive wheel 11 and the universal wheel 12 caused by an unprepared road surface or the like and suppresses the vibration from the road surface from being transmitted to the body frame 1. The spring damper 23 has a coil spring 23*a* and a damper 23*b*. The spring damper 23 expands or contracts as the subsidiary frame 4 is lifted or lowered.

The coil spring 23*a* supports a load applied to the subsidiary frame 4 by virtue of its spring force. The coil spring 23*a* expands or contracts as the subsidiary frame 4 is lifted or lowered.

A hydraulic fluid filled in the damper 23*b* passes through a damping valve (not illustrated) as the coil spring 23*a* expands or contracts, so that the damper 23*b* generates a damping force for suppressing vibration of the subsidiary frame 4.

It is noted that a configuration of the suspension unit 20 is not limited to that described above, but other configurations may be possible if a posture of the subsidiary frame 4 against the body frame 1 is maintained.

The electric assist cart 100 includes: a torque sensor 6 serving as a pair of torque detection parts for detecting a driving torque applied to each of the left and right portions of the body frame 1 as the control handle 5 is pushed and handled; a controller 30 that computes the assisting force applied to the drive wheel 11 depending on a driving torque detected by the torque sensor 6; a pair of electric motors 15 for applying an assisting force computed by the controller 30 to each drive wheel 11; a pair of brakes 16 that brakes rotation of each drive wheel 11; and a console 29 provided with various switches that can be manipulated by an operator.

The torque sensor 6 is electrically connected to the controller 30 and outputs an electric signal corresponding to the detected driving torque to the controller 30. The torque sensor 6 includes: a torsion bar (not illustrated) connected between the control handle 5 and the body frame 1 and twisted by the driving force input from the handling portion while the driving force is transmitted to the body frame 1; and a potentiometer (not illustrated) that outputs an electric signal corresponding to the torsion of the torsion bar. The torque sensor 6 detects the driving torque based on the torsion of the torsion bar. By changing the torsion bar provided in the torque sensor 6, it may also be possible to change a handling sense of an operator depending on a live load of the cart without changing other members.

Figure 3:
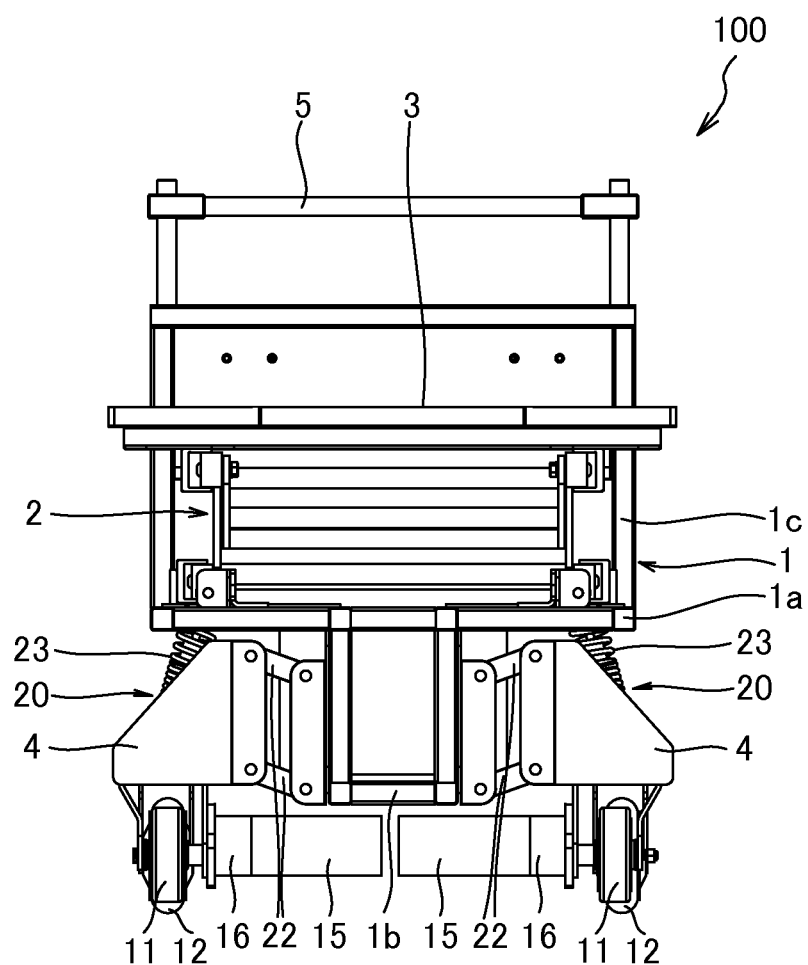
FIG. 3 is a front view of FIG. 1.

The electric motor 15 is electrically connected to the controller 30 and is rotated depending on the electric signal input from the controller 30. As illustrated in FIG. 3, the electric motor 15 is arranged inside the drive wheel 11 to apply an assisting force to the driving wheel 11. The left and right electric motors 15 are coaxially provided and arranged in series between a pair of the drive wheels 11. The electric motor 15 may have a transmission (not illustrated) that transmits rotation to the drive wheel 11 by decelerating the rotation.

The brake 16 is arranged between an output shaft of the electric motor 15 and the drive wheel 11. The brake 16 has a brake solenoid 16*a* (refer to FIG. 4) that can switch between a braking state and an unbraking state. When the brake 16 switches to the braking state, the brake 16 fixes the drive wheel 11 to a rotation disable state.

The brake solenoid 16*a* is electrically connected to the controller 30 and switches depending on an electric current supplied from the controller 30. While no electric current flows to the brake solenoid 16*a*, the brake 16 maintains the drive wheel 11 in the braking state. Meanwhile, when an electric current flows to the brake solenoid 16*a*, the brake 16 switches the drive wheel 11 to the unbraking state.

The controller 30 is mounted on the body frame 1 along with a power supply (not illustrated) or other electronic devices (not illustrated). The controller 30 performs control of the electric assist cart 100 and is a microcomputer having a central processing unit (CPU), a read-only memory (ROM), a random access memory (RAM), and an input/output (I/O) interface. The RAM stores data for the processing of the CPU, and the ROM stores a control program or the like of the CPU in advance. The I/O interface is used to input or output information from/to a connected device. Control of the electric assist cart 100 is implemented by operating the CPU or the RAM based on the program stored in the ROM.

The controller 30 is operated based on the power supplied from the power supply. When a voltage of the power supply abruptly decreases, the controller 30 stops overall control and sets the CPU to a sleep state. Assuming that a battery of 24 V is used as the power supply, the CPU is set to the sleep state, for example, when the voltage drops to, approximately, 18 V. As a result, it is possible to protect the controller 30 from an abrupt drop of the voltage of the power supply.

The controller 30 performs control such that the assisting forces for the left and right electric motors 15 are generated depending on the driving torque detected by the left and right torque sensors 6 in order to the move the electric assist cart 100 forward or backward and apply an assisting force in a straight movement, a turning movement, and a curve movement.

The controller 30 drives the electric motor 15 on a pulse width modulation (PWM) control basis. The controller 30 has a pair of electric current detection parts 15a for detecting an electric current value flowing through the left and right electric motors 15 in practice. As a result, it is possible to perform a feedback control for the electric motor 15.

Figure 4:
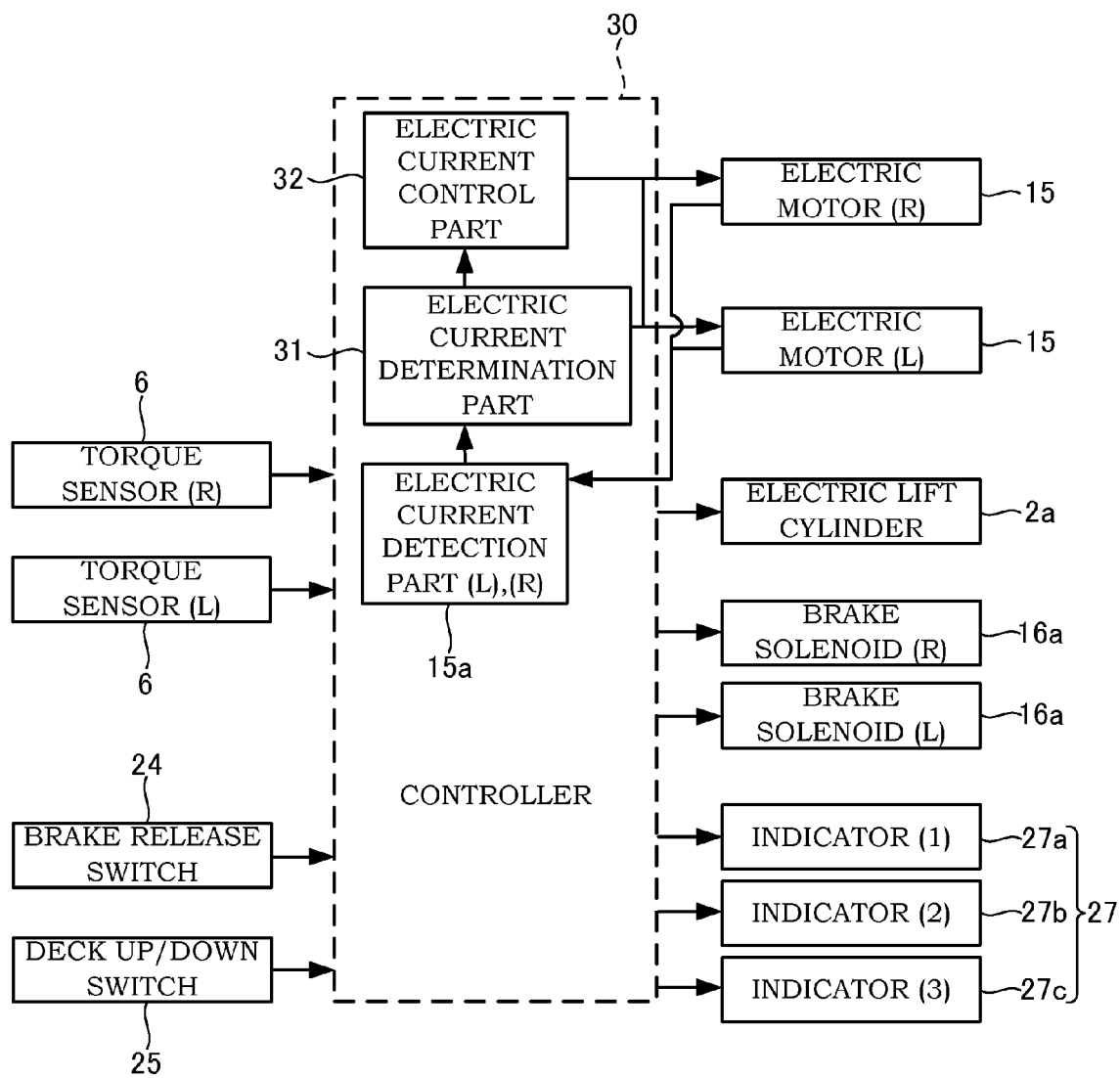
FIG. 4 is a control block diagram of the electric assist cart.

As illustrated in FIG. 4, the controller 30 has an electric current determination part 31 that determines a magnitude of the electric current flowing to the electric motor 15 and a time (continuous time) for flowing the electric current and an electric current control part 32 that stops or restricts supply of the electric current to the electric motor 15 based on the determination of the electric current determination part 31.

The console 29 is arranged on the rear face of the erected portion 1c of the body frame 1 as illustrated in FIG. 1. The console 29 is electrically connected to the controller 30. The position of the console 29 is not particularly limited if the console 29 is provided in a position where an operator can manipulate and see it. The console 29 includes: a brake release switch 24 for switching the brake solenoid 16a; a deck up/down switch 25 for controlling the electric lift cylinder 2a; and an indicator 27 that can display various failure modes.

The brake release switch 24 is a switch capable of switching the brake solenoid 16a based on an operator's manipulation. As an operator manipulates the brake release switch 24, an electric current flows to the brake solenoid 16a, and the drive wheel 11 switches to an unbraking state. As a result, the electric assist cart 100 can travel.

The deck up/down switch 25 is a switch for operating the electric lift cylinder 2a based on an operator's manipulation. As an operator manipulates the deck up/down switch 25, the electric lift cylinder 2a expands or contracts. As a result, the deck 3 is lifted or lowered against the body frame 1.

The indicator 27 indicates a state that a part of the functions stop in order to allow an operator to recognize it for a fail-safe capability in the electric assist cart 100. The indicator 27 includes a first indicator 27a, a second indicator 27b, and a third indicator 27c.

The first indicator 27a indicates the most insignificant failure mode. The first indicator 27a is turned on when the maximum value of the electric current supplied to the electric motor 15 is restricted. A state that the first indicator 27a is turned on is a first failure mode.

The second indicator 27b indicates the less insignificant failure mode than that of the first indicator 27a. The second indicator 27b is turned on when supply of the electric current to the electric motor 15 stops, or supply of the electric current to the electric lift cylinder 2a stops. A state that the second indicator 27b is turned on is a second failure mode.

The third indicator 27c indicates the most significant failure mode. The third indicator 27c is turned on when overall functions of the electric assist cart 100 stop. That is, while the third indicator 27c is turned on, supply of the electric current to the electric motor 15 and the electric lift cylinder 2a stops, and supply of the electric current to the brake solenoid 16a stops in the electric assist cart 100. Therefore, the brake 16 switches to the braking state. A state that the third indicator 27c is turned on is a third failure mode.

Each of the first to third failure modes is set only when the mode does not enter any failure mode, and a capacity of the power supply remains as many as overall functions of the electric assist cart 100 can be controlled. In addition, each failure mode is released by cutting off the power of the electric assist cart 100 once and reactivating it.

Next, a driving operation of the electric assist cart 100 will be described.

When an operator pushes the control handle 5 with both hands in parallel, the electric assist cart 100 moves forward straightly. In this case, the driving force input to the body frame 1 by pushing the control handle 5 is approximately equal between the left and right sides of the control handle 5. Therefore, the driving torques detected by left and right torque sensors 6 are also approximately equal to each other.

If the left and right torque sensors 6 detect an equal driving torque, the controller 30 instructs that the assisting force is equally applied to the left and right driving wheels 11 from the left and right electric motors 15. As a result, the assisting force is equally applied to the left and right drive wheels 11.

Therefore, the electric assist cart 100 moves forward straightly by virtue of the assisting force of the electric motor 15 in addition to the driving force applied by an operator.

It is noted that, when the electric assist cart 100 moves backward straightly, the pushing direction of the control handle 5 and the rotation direction of the electric motor 15 are reversed, and other actions are similar to those of the case where the electric assist cart 100 moves forward straightly.

Meanwhile, when an operator applies the pushing force to the control handle 5 differently between the left and right sides, the electric assist cart 100 turns left or right. In this case, the assisting force is differently applied to the left and right drive wheels 11 from the left and right electric motors 15.

Specifically, for example, when the electric assist cart 100 turns left, the pushing force applied to the control handle 5 by a right hand of an operator is stronger than the pushing force applied to the control handle 5 by a left hand of an operator. Therefore, the driving torque detected by the right torque sensor 6 is higher than the driving torque detected by the left torque sensor 6.

As a result, the controller 30 instructs that the assisting force applied from the right electric motor 15 to the drive wheel 11 is stronger than the assisting force applied from the left electric motor 15 to the drive wheel 11. As a result, the assisting force applied to the right drive wheel 11 becomes relatively stronger than the assisting force applied to the left drive wheel 11.

It is noted that the magnitude of the assisting force can be controlled depending on the pushing force applied by an operator to the control handle 5 because the left and right torque sensors 6 can detect the driving torque steplessly.

Next, a fail-safe operation in the electric assist cart 100 will be described with reference to FIG. 5.

In step S101, the controller 30 reads each of the electric current values of the left and right electric motors 15 detected by the electric current detection part 15a and a duty ratio of the PWM control in each electric motor 15.

Steps S102 and S103 are performed in order to prevent a large electric current from continuously flowing to the electric motor 15, protect the electric motor 15 or the controller 30 from heat generated by an overload, and prevent a trouble of the electric assist cart 100 in advance.

In step S102, the electric current determination part 31 determines whether or not the electric current having a magnitude equal to or larger than the first setting value flows to the electric motor 15. In this case, the first setting value is set to a maximum value of the electric current range that can be supplied to the electric motor 15 at the time of assistance in a normal use. For example, the first setting value is set to 20 [A] when the electric current supplied to the electric motor 15 in a normal use is set to 0 to 20 [A].

If it is determined in step S102 that the electric current value flowing to the electric motor 15 is equal to or larger than the first setting value, the process advances to step S103. Meanwhile, if it is determined in step S102 that the electric current value flowing to the electric motor 15 is smaller than the first setting value, the process advances to step S105.

In step S103, it is determined whether or not the electric current equal to or larger than the first setting value determined in step S102 continuously flows only for a first setting time. In this case, the first setting time is set such that the controller 30 can be prevented from heat caused by an operation. For example, the first setting time is set to 5 [s].

If it is determined in step S103 that the continuous time during which the electric current equal to or larger than the first setting value continuously flows is equal to or longer than the first setting time, the process advances to step S104, and the first failure mode is executed.

In step S104, the electric current control part 32 reduces the maximum value of the electric current that can be supplied to the electric motor 15 to be smaller than the first setting value based on the determination of the electric current determination part 31.

For example, in some cases, when a weight of the burden loaded on the deck 3 is heavy, and the electric assist cart 100 continuously climbs a hill road, the maximum assisting force may be continuously applied from the electric motor 15. In this case, in the first failure mode, the electric current that can be supplied to the electric motor 15 is reduced to, for example, 10 [A]. As a result, it is possible to prevent a high assisting force from being continuously applied and prevent an overload state of the electric motor 15 or the controller 30. Therefore, it is possible to improve reliability of the electric assist cart 100.

In addition, by turning on the first indicator 27a, it is possible to allow an operator to recognize that the mode enters the first failure mode.

It is noted that, in this case, the electric current control part 32 gradually reduces the maximum value of the electric current that can be supplied to the electric motor 15 by performing so-called "slope control." As a result, it is possible to prevent a significant deceleration shock from being generated in the electric assist cart 100 due to an abrupt decrease of the assisting force.

Meanwhile, if it is determined in step S103 that the continuous time during which the electric current equal to or larger than the first setting value continuously flows is shorter than the first setting time, the process advances to step S105.

In steps S105 and S106, a part of the functions of the electric assist cart 100 stops when an excessive electric current over a flow range in a normal use flows to the electric motor 15.

In step S105, the electric current determination part 31 determines whether or not the electric current having a magnitude equal to or larger than the second setting value flows to the electric motor 15. In this case, the second setting value is set to be higher than the first setting value. That is, while the first setting value is set to the maximum value of the electric current range of a normal use, the second setting value is set to an electric current value having a magnitude that does not flow in a normal use. For example, the second setting value is set to 25 [A] when the electric current supplied to the electric motor 15 in a normal use is set to 0 to 20 [A].

If it is determined in step S105 that the electric current value flowing to the electric motor 15 is equal to or higher than the second setting value, the process advances to step S106. Meanwhile, if it is determined in step S105 that the electric current value flowing to the electric motor 15 is lower than the second setting value, the process advances to step S107.

In step S106, it is determined whether or not the electric current equal to or larger than the second setting value determined in step S105 continuously flows for a second setting time. In this case, since the second setting time is a time during which an excessive electric current having a magnitude that does not flow in a normal use flows, the second setting time is set to a time shorter than the first setting time in order to protect the electric motor 15 or the controller 30. For example, the second setting time is set to 50 [ms].

If it is determined in step S106 that the continuous time during which the electric current equal to or larger than the second setting value continuously flows is equal to or longer than the second setting time, the process advances to step S111, and the mode switches to the second failure mode.

In step S111, the electric current control part 32 stops output of the electric current to the left and right electric motors 15. In this case, the electric current control part 32 stops output of the electric current to both the left and right electric motors 15 even when the electric current equal to or larger than the second setting value continuously flows for the second setting time to any one of the electric motors 15. As a result, assistance of the driving force from the electric motor 15 in the electric assist cart 100 stops.

In this manner, in the second failure mode, supply of the electric current to the left and right electric motors 15 stops. As a result, it is possible to protect the electric motor 15 or the controller 30 when an excessive electric current having a magnitude that does not flow in a normal use flows. In addition, by turning on the second indicator 27b, it is possible to allow an operator to recognize that the mode enters the second failure mode. Therefore, it is possible to improve safety of the electric assist cart 100.

Meanwhile, if it is determined in step S106 that the continuous time during which the electric current equal to or larger than the second setting value continuously flows is shorter than the second setting time, the process advances to step S107.

In steps S107 and S108, a part of the functions of the electric assist cart 100 stop when the assisting force is not applied from the electric motor 15 to match an instruction from the controller 30.

In step S107, the electric current control part 32 determines whether or not the duty ratio of the PWM control of the electric motor 15 is at the maximum state. For example, in the PWM control, the duty ratio of the electric motor 15 increases depending on a magnitude of the instructed assisting force when an assisting force having a certain magnitude is applied to the drive wheel 11 in response to an instruction from the controller 30. However, when the actual assisting force does not reach the instructed assisting force magnitude, the controller 30 instructs that the duty ratio further increases. Therefore, when the assisting force does not increase to the magnitude instructed from the controller 30, the duty ratio of the PWM control increases to the maximum state. In this regard, in step S107, it is determined whether or not the duty ratio of the PWM control is at the maximum state.

If it is determined in step S107 that the duty ratio of the PWM control is at the maximum state, the process advances to step S108. Meanwhile, if it is determined in step S107 that the duty ratio of the PWM control is not at the maximum state, the process advances to step S109.

In step S108, it is determined whether or not the duty ratio of the PWM control is continuously maintained at the maximum state for a third setting time. In this case, the third setting time is set to be longer than the second setting time and be shorter than the first setting time. For example, the third setting time is set to 1 [s].

If it is determined that in step S108 that the duty ratio of the PWM control is continuously maintained at the maximum state for the third setting time, the process advances to step S111, and the mode switches to the second failure mode.

In this manner, when the assisting force is not applied from the electric motor 15 to match the instruction from the controller 30, supply of the electric current to the left and right electric motors 15 stops, and the second indicator 27b is turned on. Therefore, it is possible to prevent the duty ratio of the PWM control from being continuously maintained at the maximum state and allow an operator to recognize that the mode enters the second failure mode. Therefore, it is possible to improve safety of the electric assist cart 100.

Meanwhile, if it is determined in step S108 that the duty ratio of the PWM control is not continuously maintained at the maximum state for the third setting time, the process advances to step S109.

In steps S109 and S110, a part of the functions of the electric assist cart 100 stop when a deviation occurs between a handling amount of the control handle 5 from an operator and a magnitude of the assisting force from the electric motor 15.

In step S109, the electric current determination part 31 determines whether or not a difference between the electric current value supplied to the electric motor 15 by the electric current control part 32 and the actual electric current value fed back to the electric current detection part 15a is out of a setting range. In this case, the setting range is set to a range within which a user can use the electric assist cart without an uncomfortable feeling in an actual use, that is, an allowable error range. For example, the setting range is set to a range of ±5 [A] when the electric current supplied to the electric motor 15 in a normal use is at 0 to 20 [A].

If it is determined in step S109 that the difference of the electric current value is out of the setting range, the process advances to step S110. Meanwhile, it is determined in step S109 that the difference of the electric current value is within the setting range, the process returns.

In step S110, it is determined whether or not the state that the difference of the electric current value is out of the setting range is continuously maintained for a fourth setting time. For example, the fourth setting time is set to 5 [s]. If it is determined in step S110 that the state that the difference of the electric current value is out of the setting range is continuously maintained for the fourth setting time, the process advances to step S111, and the mode switches to the second failure mode.

In this manner, if there is a deviation between the handling amount of the control handle 5 from an operator and the magnitude of the assisting force from the electric motor 15, supply of the electric current to the left and right electric motors 15 stops, and the second indicator 27b is turned on. Therefore, it is possible to prevent the state that there is a deviation between the handling amount of the control handle 5 from an operator and the magnitude of the assisting force from the electric motor 15 from being continuously maintained and allow an operator to recognize that the mode enters the second failure mode. Therefore, it is possible to improve safety of the electric assist cart 100.

Meanwhile, if it is determined in step S110 that the state that the difference of the electric current value is out of the setting range is not continuously maintained for the fourth setting time, the process returns.

In the embodiments described above, the following effects can be obtained.

If the electric current determination part 31 determines that the electric current having a magnitude equal to or larger than the first setting value continuously flows for the first setting time or longer, the electric current control part 32 reduces the maximum value of the electric current that can be supplied to the electric motor 15 to be smaller than the first setting value. Therefore, it is possible to prevent a strong assisting force from being continuously applied and prevent an overload state of the electric motor 15 or the controller 30. Therefore, it is possible to improve reliability of the electric assist cart 100.

Embodiments of this invention were described above, but the above embodiments are merely examples of applications of this invention, and the technical scope of this invention is not limited to the specific constitutions of the above embodiments.

Figure 5:
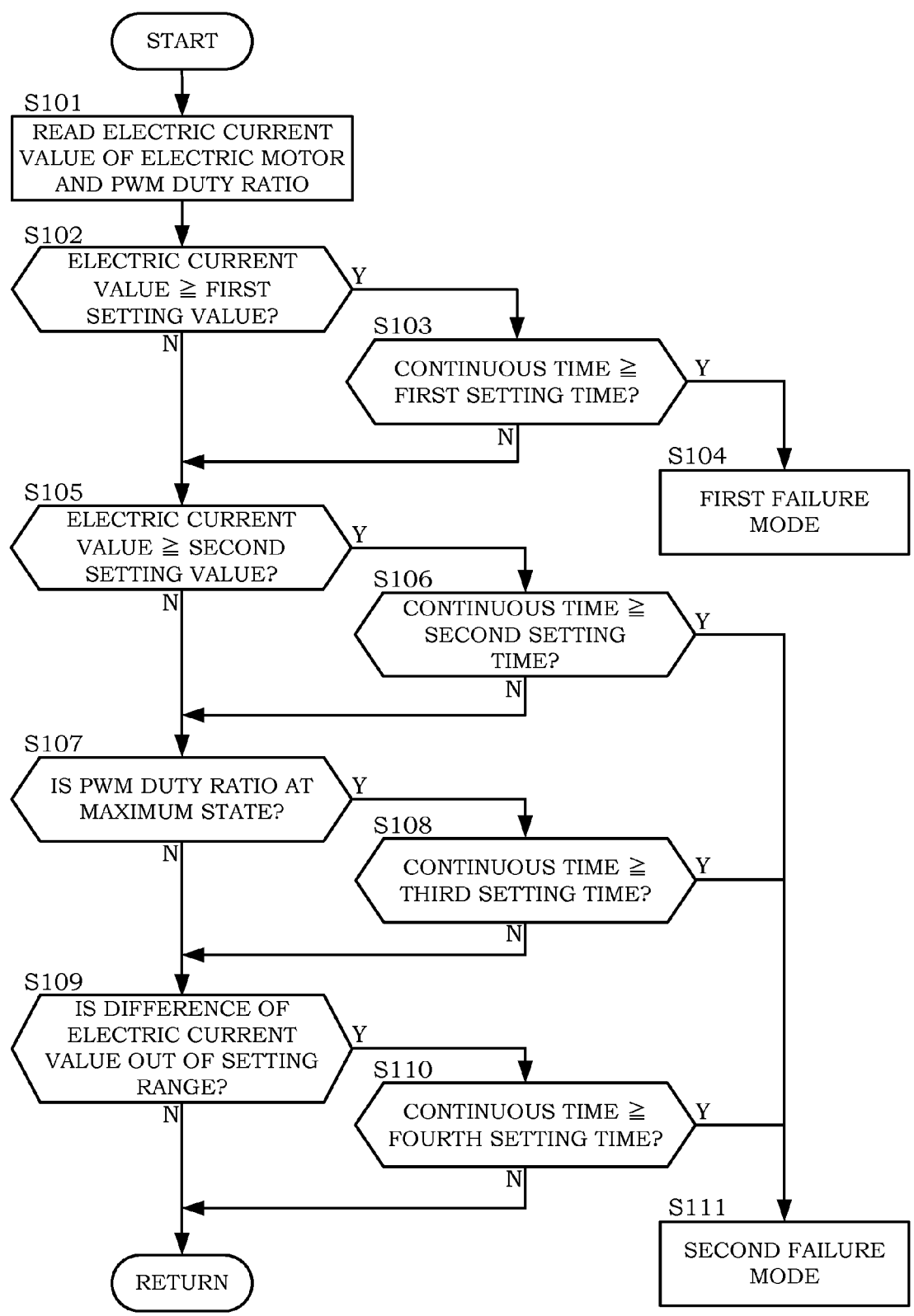
FIG. 5 is a flowchart illustrating a fail-safe operation of the electric assist cart.

For example, in the flowchart of FIG. 5, four different failure states are detected, and a single flow is executed for the control determined as the corresponding failure mode. Instead, the control for detecting every single failure state may be executed through independent flows, and a flow may be further provided for determining the failure mode when a failure state is detected in any one of the detection results.

This application claims priority based on Japanese Patent Application No. 2011-225971 filed with the Japan Patent Office on Oct. 13, 2011, the entire contents of which are incorporated into this specification.

The embodiments of this invention in which an exclusive property or privilege is claimed are defined as follows:

1. An electric assist cart that can travel by applying an assisting force in addition to a driving force applied by an operator, comprising:
   a body frame where a burden can be loaded;
   a drive wheel provided in the body frame;
   a handling portion pushed and handled by an operator to input a driving force to the body frame;
   a torque detection part that is configured to detect a driving torque applied to the body frame by pushing and handling the handling portion;
   a controller that is configured to compute an assisting force applied to the drive wheel based on the driving torque detected by the torque detection part; and
   an electric motor that is configured to apply the assisting force computed by the controller to the drive wheel,
   wherein the controller includes
      an electric current determination part that is configured to determine whether or not an electric current having a magnitude equal to or larger than a first setting value continuously flows to the electric motor for a first setting time, and
      an electric current control part that is configured to reduce a maximum value of the electric current that can be supplied to the electric motor to be smaller than the first setting value based on the determination of the electric current determination part.

2. The electric assist cart according to claim 1, wherein the first setting value is set to a maximum value of the electric current supplied to the electric motor during assistance, and
   the first setting time is set to a time during which the controller can be protected from heat generated by an operation.

3. The electric assist cart according to claim 2, wherein the electric current control part is configured to stop output of the electric current to the electric motor when an electric current having a magnitude equal to or larger than a second setting value set to be higher than the first setting value continuously flows for a second setting time.

4. The electric assist cart according to claim 1, wherein the electric current control part gradually reduces the maximum value of the electric current that can be supplied to the electric motor.

5. The electric assist cart according to claim 1, wherein the controller is configured to drive the electric motor based on pulse width modulation (PWM) control, and
   the electric current control part is configured to stop output of the electric current to the electric motor when a duty ratio of the PWM control is continuously maintained at a maximum state for a third setting time.

6. The electric assist cart according to claim 1, wherein the controller has an electric current detection part where the electric current value of the electric motor is fed back, and
   the electric current control part is configured to stop output of the electric current to the electric motor when a state that a difference between the electric current value supplied to the electric motor and the electric current value fed back to the electric current detection part is out of a setting range is continuously maintained for a fourth setting time.

\* \* \* \* \*